United States Patent [19]
Walraven et al.

[11] Patent Number: 5,968,283
[45] Date of Patent: *Oct. 19, 1999

[54] METHOD FOR HEAT STRIPPING OPTICAL FIBERS

[75] Inventors: Claude Eugene Walraven, Longpond; Robert Gordon Wiley, Henryville, both of Pa.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,403

[22] Filed: Oct. 25, 1996

[51] Int. Cl.$^6$ ................................. B08B 7/00; B08B 3/00
[52] U.S. Cl. ............................. 134/19; 134/26; 430/262; 523/332; 385/53; 385/54; 385/55
[58] Field of Search ...................... 134/19, 26; 430/262; 523/332; 385/53, 54, 55

[56] References Cited

U.S. PATENT DOCUMENTS

| | | | |
|---|---|---|---|
| 4,312,571 | 1/1982 | Ganzhorn | 134/12 |
| 5,359,681 | 10/1994 | Jorgenson et al. | 385/12 |

*Primary Examiner*—Frank C. Eisenschenk
*Assistant Examiner*—Ali R. Salimi

[57] ABSTRACT

The present invention discloses a method for heat stripping an optical fiber cable having a polymer coating and an optical fiber. A heat source is applied to the polymer coating causing the polymer coating to be heated rapidly to a break temperature, thereby causing the polymer coating to dehydrate, expand and burst outward detaching itself completely from the underneath optical fiber. The heat source is subsequently applied along the optical fiber cable causing the corresponding polymer coating to curl off and expose the optical fiber.

7 Claims, 2 Drawing Sheets

METHOD FOR HEAT STRIPPING OPTICAL FIBERS

CROSS-REFERENCES

The present invention is related to commonly assigned patent application Ser. No. 08/738,142 filed on even date herewith, entitled "A Method for Stripping Optical Fiber Cables By Hydration and Dehydration" by same inventors.

GOVERNMENT CONTRACT

This invention is made with government support. The government has certain rights in this invention.

BACKGROUND OF THE INVENTION

1. Field of the Invention

The present invention relates generally to wire stripping and, in particular, to stripping polymer coatings from optical fibers.

2. Background of the Related Art

Optical fibers are subject to several forms of impairment when their polymer coatings are removed or stripped. These impairments include tensile strength degradation which decreases an optical fiber's life, and acid or solvent residue which may obscure signal transmission through the optical fiber when spliced.

Prior art methods for removing an optical fiber's polymer coating include mechanical stripping and acid stripping, as the terms are known in the art. Mechanical stripping involves using a stripping tool, which is similar to a wire stripper, to remove the polymer coating from the optical fiber. The stripping tool cuts through the polymer coating and typically nicks or scratches the optical fiber causing degradation in its tensile strength, thereby reducing the optical fiber's longevity. For example, an optical fiber with a tensile strength of 15–16 pounds is typically reduced to 3–5 pounds after mechanical stripping. Minimizing tensile strength degradation is important particularly in situations where high repair costs make longevity a system requirement.

The primary prior art method for removing an optical fiber's polymer coating with minimal degradation in tensile strength is acid stripping using a hot Sulfuric Nitric mixture, i.e., 95% Sulfuric acid and 5% Nitric acid. Specifically, this prior art method involves heating the Sulfuric Nitric mixture to approximately 185° C., immersing the optical fiber in the hot Sulfuric Nitric mixture for approximately 20 seconds, and rinsing the optical fiber for 2–10 seconds in a rinser, such as Acetone, Alcohol, Methanol, purified water, or a combination of these. Although tensile strength degradation is minimized, this prior art method may leave an acid or a solvent residue between spliced optical fibers at the splice point, thereby degrading the tensile strength of the optical fiber at the splice point.

Furthermore, safety concerns are often present with acid stripping methods. Field technicians employing acid stripping methods require well-ventilated areas, such as laboratory environments with exhaust hoods, and protective gear to safeguard themselves from fumes and burns associated with acids. However, such facilities are generally not readily available to the field technicians. Accordingly, there exist a need for a method for removing a polymer coating from an optical fiber in a safe manner while minimizing tensile strength degradation.

SUMMARY OF THE INVENTION

The present invention discloses a method for removing polymer coatings from optical fibers in a safe manner while minimizing tensile strength degradation. In one embodiment of the present invention, a heat source is applied to a first point along an optical fiber cable causing the polymer coating to expand and burst, thereby separating the polymer coating from the optical fiber at the first point. Specifically, the heat source heats the polymer coating at a rate equal to or greater than a break rate to at least a break temperature. The break rate is a minimum rate of temperature increase for the polymer coating that will prevent the polymer coating from burning when being heated to the break temperature, and the break temperature is a minimum temperature operable to cause the polymer coating to dehydrate, expand and burst outward, thereby completely separating the polymer coating from the optical fiber. In one embodiment, the heat source heats the polymer coating by generating forced air at a temperature approximately at or above 470° C.

Upon expanding and bursting of the polymer coating, the heat source is applied along the optical fiber cable towards an end of the optical fiber cable causing the polymer coating to separate from the underneath optical fiber. In an alternate embodiment, the heat source is applied along the optical fiber cable towards a second point along the optical fiber cable. In this alternate embodiment, the second point is a point along the optical fiber cable where the polymer coating was previously separated from the optical fiber by the heat source.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is a method for stripping polymer coatings from optical fibers in a safe manner while minimizing tensile strength degradation. Specifically, the present invention method uses a high temperature heat source to rapidly heat and remove polymer coatings from optical fibers while minimizing tensile strength degradation.

Figure 1:
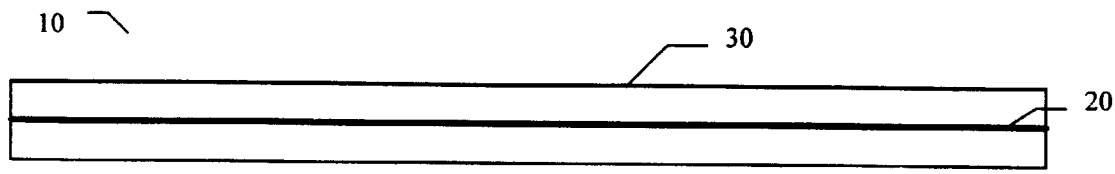
FIG. 1 depicts a typical optical fiber cable used in accordance with the present invention.

Referring to FIG. 1, there is illustrated an optical fiber cable 10 used in accordance with the present invention. As shown in FIG. 1, the optical fiber cable 10 comprises an optical fiber 20 and a polymer coating 30. To strip the polymer coating 30 from the optical fiber 20, the optical fiber cable 10 is rapidly heated with a heat source to at least a "break" temperature, which is a minimum temperature operable to dehydrate, expand, and "pop" (separate or burst) the polymer coating 30 outward. Upon "popping," the polymer coating will split at the pop point, i.e., point where the polymer coating burst, thereby exposing the underneath optical fiber at the pop point.

If the polymer coating 30 is not heated to at least the break temperature, the polymer coating 30 may burn and fuse onto the optical fiber 20, thereby impairing the optical fiber 20.

Therefore, the heat source must be at least generating heat at the break temperature before the polymer coating can be heated by the heat source. The range of temperatures at which the polymer coating burns is referred to herein as a "burn range." Note that the break temperature is beyond the range of the burn range.

Similarly, if the rate at which the polymer coating 30 is heated to the break temperature causes the polymer coating to remain in the burn range too long, i.e., the heating rate is too slow, the polymer coating 30 will burn and fuse to the optical fiber 20. Thus, the heating rate of the polymer coating 20 to the break temperature is a minimum rate of temperature increase for the polymer coating that will prevent burning of the polymer coating, i.e., break rate.

Accordingly, the heat source is operable to heat the polymer coating at a break rate to at least the break temperature. In one embodiment of the present invention, the heat source is an apparatus operable to generate forced air at a temperature of approximately 470° C., such as a heat shrink gun rated at 1500 watts.

Figure 2:
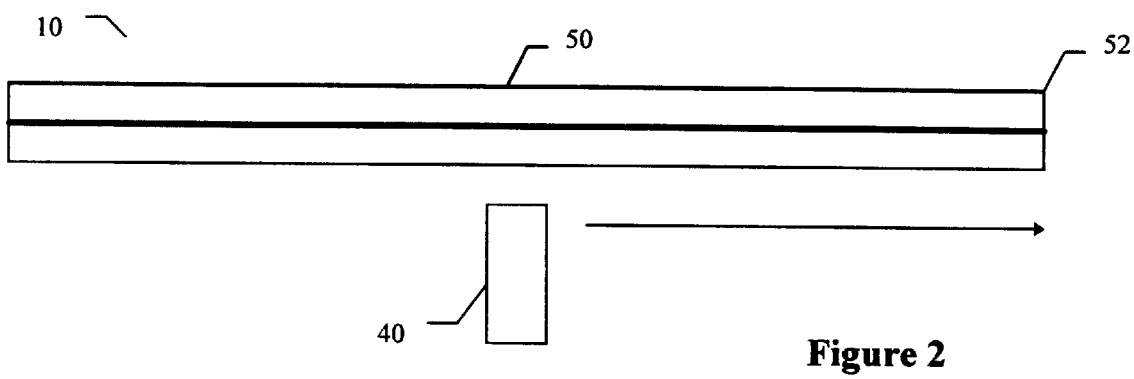
FIG. 2 depicts an illustration of a technique for removing a polymer coating section at the end of an optical fiber cable.

The present invention method includes two techniques for removing strips of polymer coatings depending on the location of the polymer coating strips to be removed. Specifically, the present invention includes a technique for removing a polymer coating section at the end of the optical fiber cable and a technique for removing a polymer coating section in the middle of the optical fiber cable. Referring to FIG. 2, there is shown an illustration of the first technique for removing a section of polymer coating between a point 50 and the end of the optical fiber cable, i.e., point 52. As shown in FIG. 2, the optical fiber cable 10 is held over a heat source 40 at the point 50 along the optical fiber cable 10. The polymer coating at the point 50 will pop almost immediately exposing the optical fiber and splitting the polymer coating at the point 50. Upon popping of the polymer coating, the optical fiber cable 10 is moved over the heat source 40 such that the heat is applied along the optical fiber cable 10 between the points 50 and 52 causing the corresponding polymer coating to curl and drop off the optical fiber.

Figure 3:
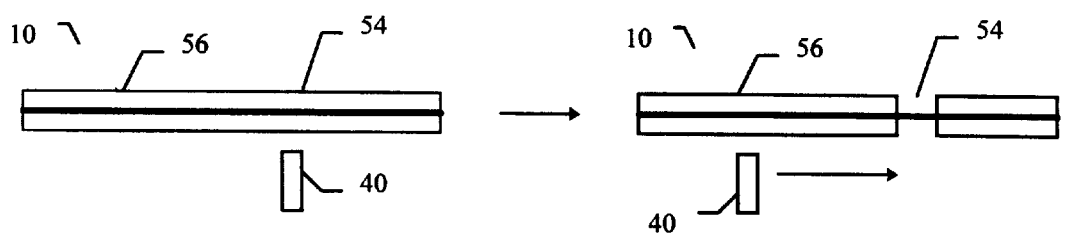
FIG. 3 depicts an illustration of a technique for removing a polymer coating section in the middle of an optical fiber cable.

Referring to FIG. 3, there is shown an illustration of the second technique for removing the polymer coating section between points 54 and 56 in the middle of the optical fiber cable. As shown in FIG. 3, the optical fiber cable 10 is held over the heat source 40 at the point 54 along the optical fiber cable 10 causing the polymer coating at the point 54 to pop almost immediately, thereby exposing the optical fiber and splitting the polymer coating at the point 54. Upon popping of the polymer coating, the optical fiber cable 10 is removed from the heat source 40 and re-heated at the point 56. The polymer coating at the point 56 will subsequently pop and, upon popping, the optical fiber cable 10 is moved over the heat source 40 such that the heat is applied along the optical fiber cable 10 between the points 56 and 54 causing the corresponding polymer coating to curl and drop off the optical fiber.

Note that it is necessary to split the polymer coating from the optical fiber at two points before attempting to curl a section of polymer coating off the optical fiber otherwise the polymer coating will remain attached to the optical fiber cable. Suppose the polymer coating was popped only at the point 56 and subsequently moved across the heat source towards the point 54. A section of polymer coating will curl off the optical fiber from the point 56 toward the point 54 but will remain attached to the unheated polymer coating at the point 54.

Upon stripping the polymer coating from the optical fiber using one of the above described techniques of the present invention, the optical fiber is ready to be cleaved and splice. Techniques for cleaving and splicing optical fibers are well-known in the art.

Figure 4:
FIG. 4 depicts a table containing results from a series of optical fiber tensile strength degradation tests applying the present invention.

Unlike prior art acid stripping methods, the above described embodiments of present invention uses no acids or solvents, therefore acid or solvent residues cannot remain on the optical fiber. For the same reason, the present invention is safer than prior art acid stripping methods, i.e., fumes and burns associated with acids are avoided. Unlike prior art mechanical stripping methods, the present invention minimizes tensile strength degradation since no nicks or scratches are being made on the optical fiber. Referring to FIG. 4, there is illustrated a table containing results from a series of tests conducted using depressed clad (DC) optical fibers sold by AT&T and a tension tester sold under the trademark "Instron 1000." As shown in FIG. 4, the tensile strength degradation resulting from the present invention is minimal in comparison to the tensile strength degradation resulting from the prior art mechanical stripping methods which reduce the tensile strength of an optical fiber to approximately 3–5 pounds.

Although the present invention has been described in considerable detail with reference to certain embodiments, other versions are possible. Therefore, the spirit and scope of the present invention should not be limited to the description of the embodiments contained herein.

The invention claimed is:

1. A method for stripping an optical fiber cable having a polymer coating and an optical fiber, the method comprising the steps of:

detaching the polymer coating at a first point from the optical fiber using a heat source generating forced air at least at a break temperature, the break temperature being approximately 470 degrees Celsius; and applying the heat source along the optical fiber cable between the first point and an end of the optical fiber cable causing the polymer coating between the first point and the end to separate from the optical fiber without mechanical stripping.

2. The method of claim 1, wherein the step of detaching the polymer coating comprises the step of:

heating the polymer coating at a rate equal to or greater than a break rate to at least the break temperature at the first point with the heat source, the break rate being a minimum rate of temperature increase for the polymer coating that will prevent burning of the polymer coating as the polymer coating is being heated to the break temperature.

3. The method of claim 2, wherein the step of applying the heat source comprises the step of:

heating the optical fiber cable between the first point and the end at the rate equal to or greater than the break rate to at least the break temperature.

4. A method for stripping a polymer coating from an optical fiber, the method comprising the steps of:

detaching at a first point the polymer coating from the optical fiber using a heat source generating forced air at least at a break temperature, the break temperature being approximately 470 degrees Celsius;

disjoining at a second point the polymer coating from the optical fiber using the heat source to heat the polymer coating at the second point to at least the break temperature; and applying the heat source along the polymer coating between the second point and the first point cawing the polymer coating between the second point and the first point to separate from the optical fiber without mechanical stripping.

5. The method of claim 4, wherein the step of detaching at the first point comprises the step of:

heating the polymer coating at a rate equal to or greater than a break rate to at least the break temperature at the first point with the heat source, the break rate being a minimum rate of temperature increase for the polymer coating that will prevent burning of the polymer coating as the polymer coating is being heated to the break temperature.

6. The method of claim 5, wherein the step of disjoining at the second point comprises the step of:

heating the polymer coating to at least the break temperature at the second point with the heat source at least at the break rate.

7. The method of claim 5, wherein the step of applying the heat source comprises the step of:

heating the polymer coating between the second point and the first point at the rate equal to or greater than the break rate to at least the break temperature.

* * * * *